(12) United States Patent
Watanabe et al.

(10) Patent No.: US 8,903,804 B2
(45) Date of Patent: Dec. 2, 2014

(54) DATA EXISTENCE JUDGING DEVICE AND DATA EXISTENCE JUDGING METHOD

(71) Applicant: Fujitsu Limited, Kawasaki (JP)

(72) Inventors: Takashi Watanabe, Kawasaki (JP); Yoshihiro Tsuchiya, Yokohama (JP); Yasuo Noguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 144 days.

(21) Appl. No.: 13/772,744

(22) Filed: Feb. 21, 2013

(65) Prior Publication Data

US 2013/0262472 A1    Oct. 3, 2013

(30) Foreign Application Priority Data

Mar. 28, 2012  (JP) ................................. 2012-074855

(51) Int. Cl.
*G06F 7/00* (2006.01)
*G06F 17/30* (2006.01)

(52) U.S. Cl.
CPC ................................. *G06F 17/3033* (2013.01)
USPC .......................................................... 707/716

(58) Field of Classification Search
CPC .................... G06F 17/30442; G06F 17/30536; G06F 21/6218; G06F 17/30463; G06F 17/30545
USPC .......................................................... 707/716
See application file for complete search history.

(56) References Cited

FOREIGN PATENT DOCUMENTS

JP    2011-171995    9/2011

*Primary Examiner* — Truong Vo
(74) *Attorney, Agent, or Firm* — Fujitsu Patent Center

(57) ABSTRACT

A data existence judging device includes: L number of first storage areas each associated with one of L hash values; M number of second storage areas each associated with some of the L hash values; an information setting part, for each data in a data set, to calculate k hash values about the data, and, for each calculated hash value, when a count value in the first storage area associated with the calculated hash value is less than $2^n-1$, to count up the count value, whereas when the count value is $2^n-1$, to set 1 into the first storage area associated with the calculated hash value; and a judging part to calculate k hash values about an input data, and to judge that the input data is a new data when a count value in the first storage area associated with the input data is 0.

7 Claims, 17 Drawing Sheets

FIG. 6

| UPPER BIT | 0 | | | 1 | | | 0 | | | 1 | | | 0 | | | 0 | |
|---|---|---|---|---|---|---|---|---|---|---|---|---|---|---|---|---|---|
| LOWER BIT | 0 | 1 | 0 | 1 | 1 | 1 | 0 | 0 | 0 | 0 | 0 | 1 | 0 | 1 | 0 | 0 | 1 | 0 |

| UPPER BIT | A | | | E | | |
|---|---|---|---|---|---|---|
| LOWER BIT | B | C | D | F | G | H |

28

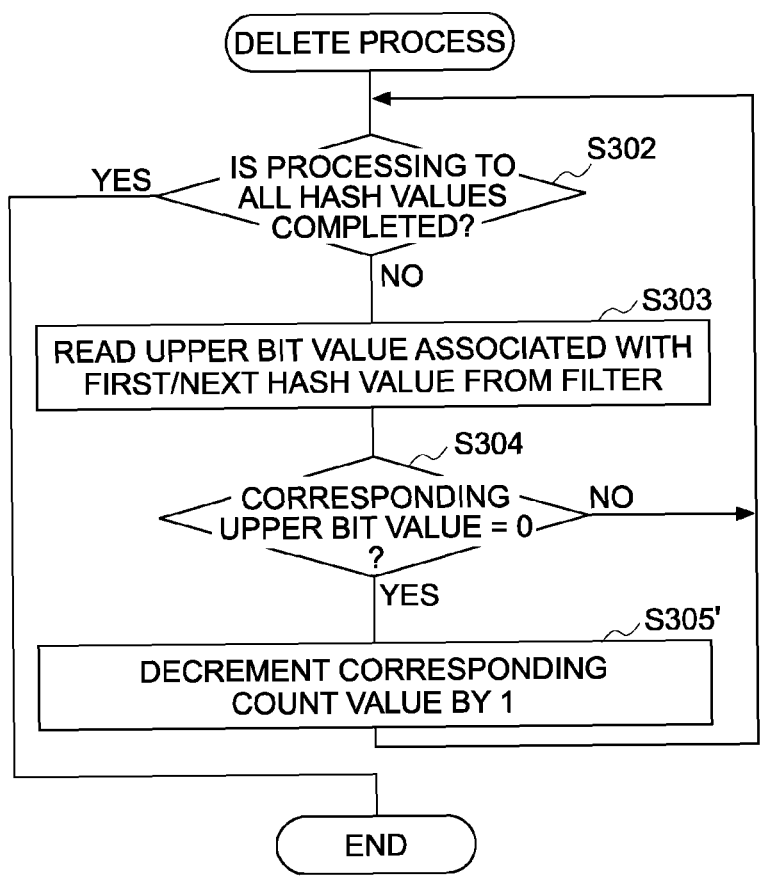

DATA EXISTENCE JUDGING DEVICE AND DATA EXISTENCE JUDGING METHOD

CROSS-REFERENCE TO RELATED APPLICATIONS

This application is based upon and claims the benefit of priority of the prior Japanese Patent Application No. 2012-074855, filed on Mar. 28, 2012, the entire contents of which are incorporated herein by reference.

FIELD

The present invention relates to a data existence judging device, the data existence judging method, and a non-transitory computer readable recording medium.

BACKGROUND

As data structures that can be used for testing existence of a data, a Bloom Filter and a counting Bloom filter are known.

To start with, the Bloom filter will be explained referring to FIGS. 1A and 1B.

As illustrated in FIG. 1A, the Bloom filter is a bit array of m bits (m=18 in FIG. 1A), for example. When the Bloom filter used, k hash functions (k=3 in FIG. 1A) are also prepared (defined). Moreover, each hash value obtained by each hash function is associated with one bit of the Bloom filter. Then, with respect to each existing data, k hash values of the existing data are obtained using the k hash functions, and "1" is set to a bit (initial value of which is zero) associated with each obtained hash value in the Bloom filter.

At the time of testing existence of a given data (denoted hereinafter as the judgment target data), k hash values of the judgment target data are obtained using the k hash functions. Then, if any of the bits associated with the obtained hash values is zero, the judgment target data is judged to be a new data. If not, the judgment target data is judged to be a new data or an existing data.

Thus, by using the Bloom filter, it is possible to judge existence of the judging target data (whether the judgment target data is a new data or a data that can be a new data) rapidly in a way that requires a small storage capacity. The Bloom filter is, however, a data structure from which the registered information cannot be deleted.

Specifically, in FIG. 1A, the bits of the Bloom filter which represent the existence of data x are the 2nd, 6th and 14th bits from the left. Therefore, for the purpose of deleting the data x from the data set {x, y, z}, it is conceivable to change each of the 2nd, 6th and 14th bits of the Bloom filter into zero. However, if such update is made to the Bloom filter, as shown in FIG. 1B, it follows that the data w, which is the same as the data z contained in the data set, is judged to be a new data. Since such situations extinguish the feature of the Bloom filter that false negative results are not yielded, deleting the registered information from the Bloom filter is impossible.

Next, the counting Bloom filter will be discussed referring to FIGS. 2A and 2B.

The counting Bloom filter is an improved version of the Bloom filter which allows the registered information to be deleted. As schematically shown in FIG. 2A, the counting Bloom filter (which will be hereinafter termed the CBF) has such a configuration that can store n (≥2) bits information per hash value.

Contents of the CBF are updated as follows.

In the case of registering information of an existing data: To each of the storage areas associated with the hash values obtained from the existing data, "1" is added.

In the case of deleting information of a data: From value of each of the storage areas associated with k hash values obtained from the data to be deleted, "1" is subtracted.

Specifically, in FIG. 2A, the bits of the Bloom filter which represent the existence of data x are the 2nd, 6th and 14th bits from the left. Therefore, when deleting the data x from the data set {x, y, z}, the value of each of the 2nd, 6th and 14th bits from the left of the CBF is decremented by "1". As a result, the situation of the CBF will be changed into the situation illustrated in FIG. 2B, i.e., the situation which causes that data identical with any data (w in FIG. 2B, for example) within the data set {y, z} not to be wrongly judged to be a new data.

Thus, the CBF has the feature to delete the registered information. However, required memory size to actualize (implement) the CBF is n times as large as that for the bloom filter.

PRIOR ART DOCUMENTS

Patent Document 1: Japanese Patent Laid-Open No. 2011-171995

SUMMARY

According to an aspect of the embodiments, a data existence judging device includes:

L number of first storage areas each of which associated with one of L number of hash values different from each other and is capable of storing a count value of n (≥1) bit(s);

M number of second storage areas each of which associated with one or more of the L (>M) number of hash values different from each other and is capable of storing a value of one bit;

an information setting part, with respect to each data in a data set, to calculate k number of hash values about the data using k number of hash functions that returns one of the L number of hash values, and, with respect to each calculated hash value, when a count value stored in a first storage area associated with the calculated hash value among the L number of first storage areas is less than $2^n-1$, to count up the cont value, whereas when the count value is equal to $2^n-1$, to set "1" into a second storage area associated with the calculated hash value; and a judging part to calculate k number of hash values about an input data using the k number of hash functions, and to judge, when a count value stored in a first storage area associated with the input data among the L number of first storage areas is "0", that the input data is a new data.

According to another aspect of the embodiments, a data existence judging method, performed by a computer, of judging whether an input data is a new data not included in an existing data set by using L number of first storage areas and M (>L) number of second storage area reserved on a memory, each of the L number of first storage areas being associated with one of L number of hash values different from each other and being capable of storing a count value of n (≥1) bit(s), and each of the M number of second storage areas being associated with one or more of the L number of hash values different from each other and being capable of storing a value of one bit, includes:

with respect to each data in a data set, calculating k number of hash values about the data using k number of hash functions that returns one of the L number of hash values;

with respect to each calculated hash value, when a count value stored in a first storage area associated with the calculated hash value among the L number of first storage areas is less than $2^n-1$, counting up the count value, whereas when the count value is equal to $2^n-1$, setting "1" into a second storage area associated with the calculated hash value among the M number of second storage areas; and calculating k number of hash values about an input data using the k number of hash functions, and judging that the input data is a new data when a count value stored in a first storage area associated with the input data among the L number of first storage areas is "0".

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF EXPLANATION OF THE DRAWINGS

FIG. 6 is an explanatory diagram of an upper bit sharing counting Bloom filter provided in the deduplication storage device according to the embodiment;

FIG. 7 is an explanatory diagram of the upper bit sharing counting Bloom filter provided in the deduplication storage device according to the embodiment;

FIG. 18 is a flowchart of the delete process for the upper bit sharing counting Bloom filter that can store n bits as each count value.

DESCRIPTION OF EMBODIMENTS

In-depth descriptions of an embodiment of the present invention will hereinafter be made with reference to the drawings. Configuration of the embodiment, which will hereinafter be described, are nothing more than exemplification of the present invention, and the present invention is not limited to the configuration of the embodiment.

Although the data existence judging technology developed by inventors can be used for various devices and systems, hereafter, an embodiment of the data existence judging technology that the inventors developed is described giving an example of a case where the technology is applied to a deduplication storage device.

Figure 3:
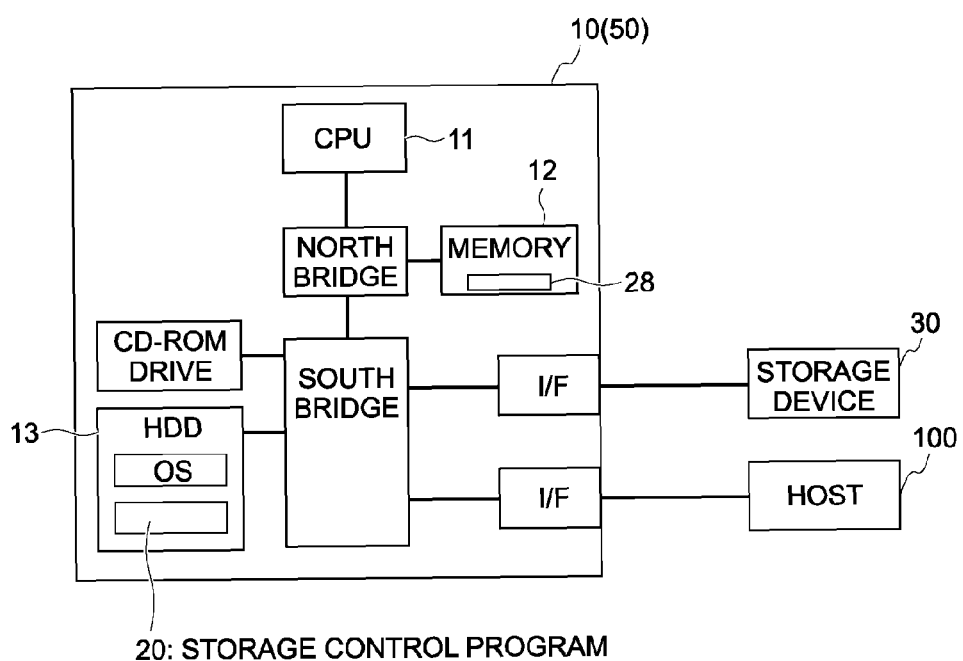
FIG. 3 is a hardware configuration diagram of a deduplication storage device according to an embodiment.

FIG. 3 illustrates a hardware configuration of a deduplication storage device 10 employing the data existence judging technology according to the embodiment (which will be hereinafter termed the deduplication storage device 10 according to the embodiment). Further, FIG. 4 illustrates a functional block diagram of the deduplication storage device 10 according to the embodiment.

As depicted in FIG. 3, the deduplication storage device 10 according to the present embodiment is a device where an OS (Operating System), a storage control program 20, etc. are installed into an HDD (Hard Disk Drive) 13 of a computer 50 connected to a storage device 30 and a host 100.

Figure 4:
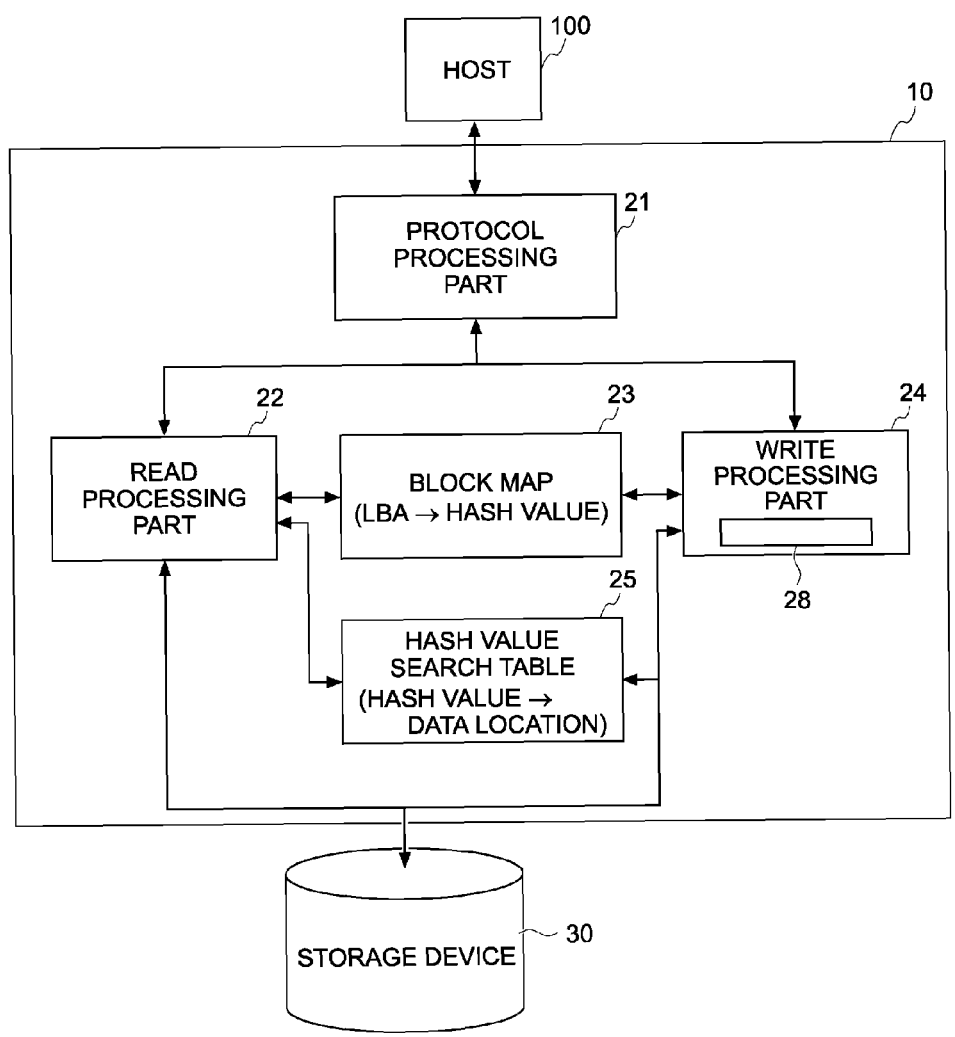
FIG. 4 is a functional block diagram of the deduplication storage device according to the embodiment.

The storage control program 20 is a program that makes the computer 50 operate as the deduplication storage device 10 having various units (functional blocks) illustrated in FIG. 4.

Namely, when the CPU 11 executes the storage control program 20, the computer 50 operates as the deduplication storage device 10 including a protocol processing part 21, a read processing part 22, a block map 23, a write processing part 24, and a hash value search table 25.

The protocol processing part 21 is a unit (a functional block) that receives I/O requests from the host 100, classifies the I/O requests into read requests and write requests, and supplies each read request and each write request to the read processing part 22 and the write processing part 24, respectively. Note that the I/O request that the protocol processing part 21 receives is a request that specifies an access destination (a read/write destination) by LBA (Logical Block Address).

The block map 23 is information that are updated so as to contain, with respect to each LBA at which data is already stored, a verification hash value about the data, and to contain, with respect to each LBA at which data is not stored, free space information indicating to the effect. Although details of the verification hash value stored in the block map 23 will be described later, the block map 23 is information (a table) that is prepared on the memory 12, and is backed up into the storage device 30 as required.

The hash value search table 25 is a table to store, with respect to each of the verification hash values stored in the block map 23, a data location (a physical address) of the data, in the storage device 30, associated with the verification hash value. More specifically, the hash value search table 25 is a table capable of storing two or more records in each of which the verification hash value and the data location are set.

Figure 5:
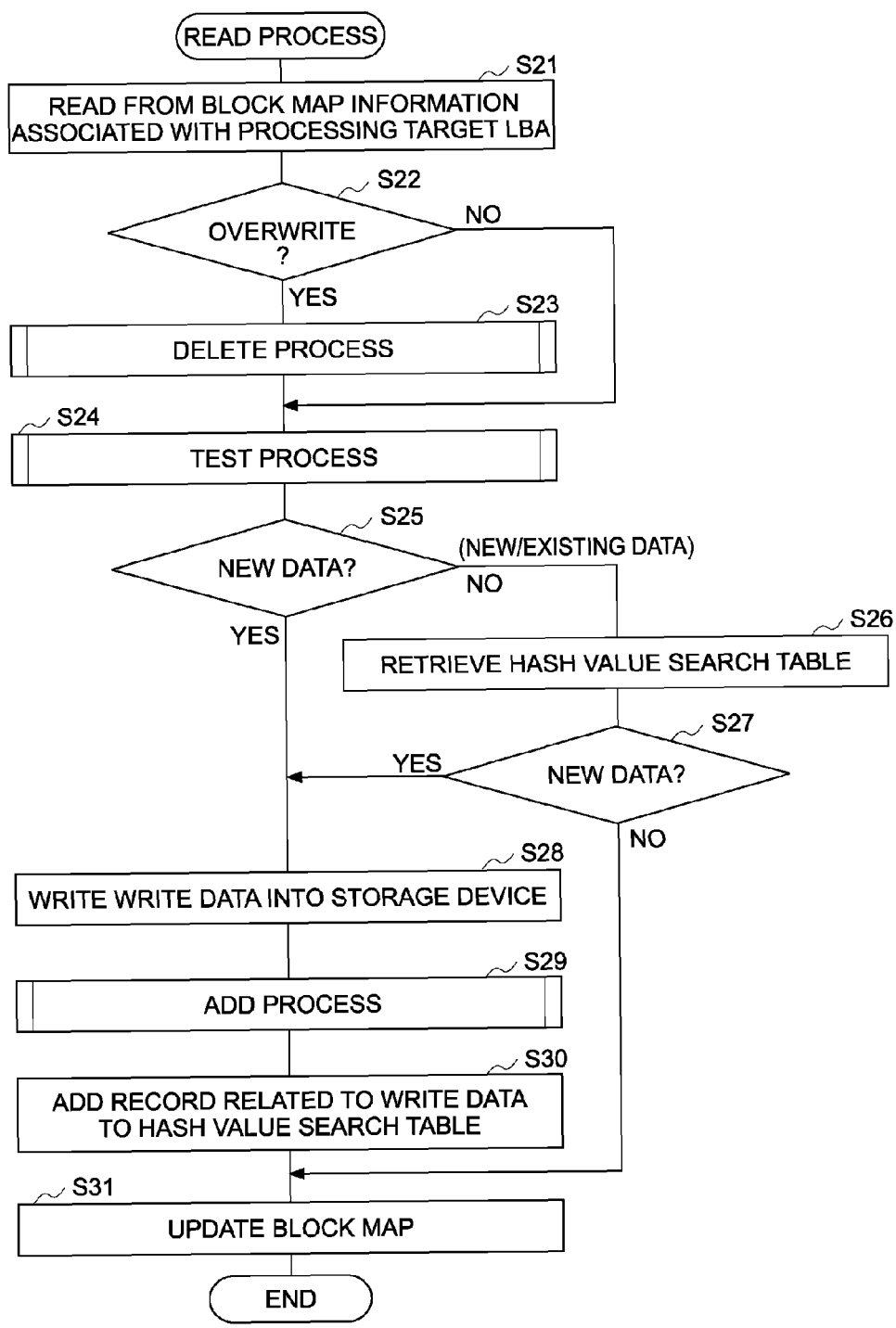
FIG. 5 is a flowchart of a write process that a write processing part of the deduplication storage device according to the embodiment performs.

The write processing part 24 is a unit (a functional block) that performs a write process in steps shown in FIG. 5 when a write request is given from the protocol processing part 21. In advance of a detailed discussion on this write process, configuration of an upper bit sharing counting Bloom filter 28 (hereinafter termed the filter 28 or the upper bit sharing CBF 28) will be discussed.

As schematically illustrated in FIG. 6, the filter 28 has 3M lower bits (3M number of lower bits) and one upper bit provided for every three lower bits. FIG. 6 illustrates a case where L, which is the number of first storage areas, is eighteen; M, which is the number of the second storage areas, is six; and each count value is one bit. Note that though only eighteen lower bits are depicted in FIG. 6, the filter including more lower bits is usually used as the filter 28. Further, the filter 28 gets into the situation illustrated in FIG. 6 (the situation where there are bits whose values are ones) after one or more data are written into the storage devices 30. In other words, all bits of the filter 28 are filled with zeros until a data is written into the storage device 30 for the first time.

Moreover, the deduplication storage device 10 is configured (programmed) so that a storage region on the memory 12 (FIG. 3) functions as the filter 28. Furthermore, when the bits of the filter 28 are respectively represented as A through H as illustrated in FIG. 7, the deduplication storage device 10 is a device where locations of bit values of the filter 28 on the memory 12 have been decided so as to be able to acquire, by reading one byte data from the memory 12, the data containing bit values of A, B, C, D, E, F, G and H, in that order.

Referring back to FIG. 5, the discussion on the write process will continuously proceed. Note that, in the following discussion, a processing target LBA is defined as a LBA contained in a write request supplied from the protocol processing part 21, and a write data is a data requested to write by the write request. Further, a new/existing data is defined as a data which can be a new data.

As shown in FIG. 5, the write processing part 24 having started the write process, to begin with, reads information (verification hash value or free space information) associated with the processing target LBA from the block map 23 (step S21).

When the information read from the block map 23 is the free space information, i.e., when the write request of this time is not an overwrite request (step S22; NO), the write processing part 24 performs a test process (step S24).

Figure 8:
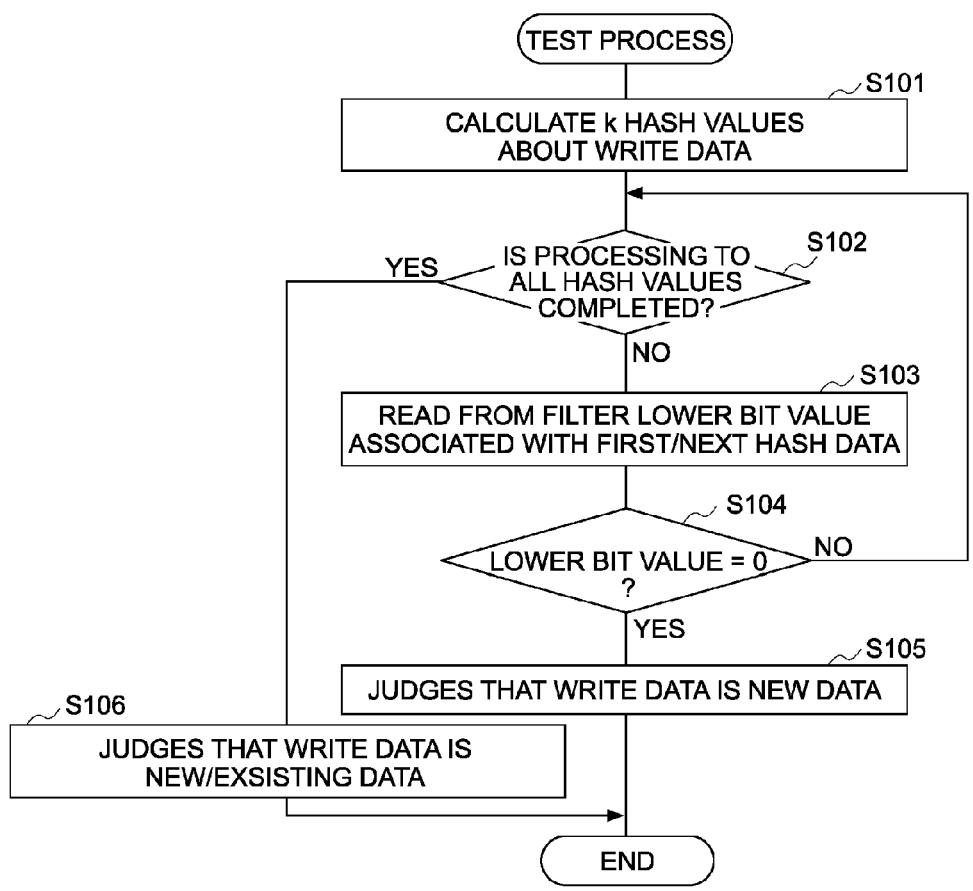
FIG. 8 is a flowchart of a test process performed in the write process of FIG. 5.

The test process performed at step S24 is a process in a procedure shown in FIG. 8. That is, the write processing part 24 having started this test process, at first, calculates the verification hash value of the write data, and calculates k hash values of the verification hash value using k hash functions that are preset (step S101). Note that each of the hash values obtained by the k hash functions is associated with one lower bit of the filter 28. Further, each upper bit of the filter 28 is associated with the hash values associated with its lower bits.

The write processing part 24 having finished the process of step S101 judges whether processing of steps S103 and S104 to every hash value is completed (step S102).

If the processing to every hash value is not completed (step S102; NO), the write processing part 24 reads from the filter 28 a value of the lower bit associated with the first (or next) hash value in k number of the calculated hash values (step S103).

Then, if the read value of the lower bit is zero (step S104; YES), the write processing part 24 judges that the write target data is a new data (step S105), and terminates this test process.

Whereas if the read value of the lower bit is not zero (step S104; NO), the write processing part 24 performs the processing subsequent to step S102 again.

The write processing part 24 iterates the above-mentioned processing until zero is read as the lower bit value (the value of the lower bit) about a certain hash value or the processing to all hash values is completed. The write processing part 24, when zero is read as the lower bit value about one of the 2nd through k-th hash values, judges that the write data is a new data (step S105), and terminates the test process. On the other hands, when the processing to all hash values is completed without being read zero as the lower bit value about any hash value (step S102; YES), the write processing part 24 judges that the write data is a new/existing data (step S106), and terminates the test process.

The write processing part 24 having finished the test process (FIG. 6; step S24), when judging that the write data is a new data in the test process (step S25; YES), writes the write data to an empty block in the storage device 30 (step S28).

Figure 9:
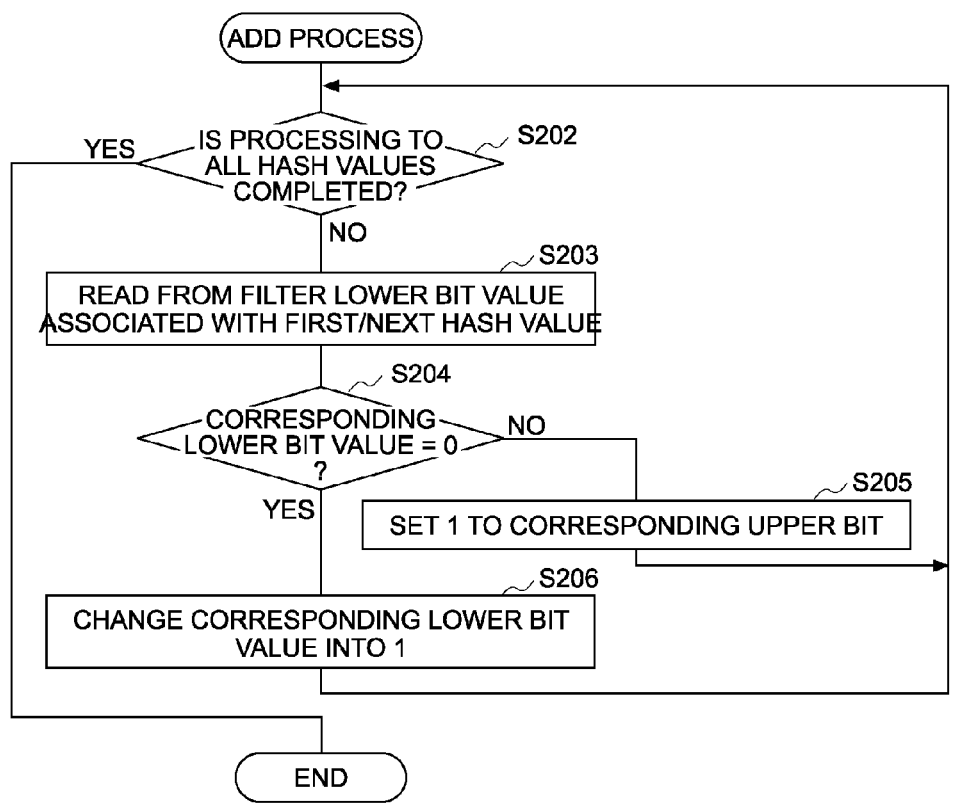
FIG. 9 is a flowchart of an add process performed in the write process of FIG. 5.

In the next step S29, the write processing part 24 performs an add process in steps shown in FIG. 9.

That is, the write processing part 24 having started this add process, at first, judges whether or not processing of steps S203-S205 to the k hash values calculated in step S101 (FIG. 1) is completed (step S202).

If the processing to all hash values is not completed (step S202; NO), the write processing part 24 reads from the filter 28 the lower bit value associated with the first (or next) hash value (hereinafter termed the processing target hash value) in the k hash values (step S203).

The write processing part 24, if the lower bit value associated with the processing target hash value is zero (step S204; YES), changes the lower bit value into "1" (step S206), and then starts the processing subsequent to step S202.

On the other hands, if the lower bit value associated with the processing target hash value is "1" (step S204; NO), the write processing part 24 sets "1" to the upper bit of the filter 28 associated with the processing target hash value (step S205). Note that this process is a process by which the value of the upper bit is not changed as the case may be.

Thereafter, the write processing part 24 restarts the processing subsequent to step S202, and terminates to this add process when the processing to all hash values is completed (step S202; YES).

The write processing part 24 having finished the add process (FIG. 5; step 29), in subsequent step S30, to start with, calculates verification hash value about the write data using a preset hash function. Herein, verification hash values are defined as hash values that are decided so that, if the verification hash value of the write data is identical with the verification hash value of an existing data, the write data can be regarded as data identical with the existing data.

Subsequently, the write processing part 24 adds to the hash value search table 25 a record containing the calculated verification hash value and the data location at which the write data is written by the process of step S28. Then, the write processing part 24 terminates the process of step S30.

Thereafter, the write processing part 24 updates the information relating to the processing target LBA on the block map 23 (step S31). Specifically, at this step S31, the write processing part 24 performs a process of rewriting the information on the block map 23 associated with the processing target LBA into the verification hash value of the write data.

Further, when judging that the write data is a new/existing data (step S25; NO), the write processing part 24 calculates the verification hash value of the write data, and retrieves the hash value search table 25 by the calculated verification hash value (step S26).

If there is no record containing the calculated verification hash value in the hash value search table 25, it follows that the write data is a new record (step S27; YES). The write processing part 24 therefore starts the processing subsequent to step S28. Note that, at step S30 performed in this case, a record is added to the hash value search table 25 using the verification hash value calculated by the process of step S26 without recalculating the verification hash value.

On the other hands, if the record containing the calculated verification hash value can be retrieved from the hush value search table 25, it follows that the data identical with the write data already exists (step S27; NO). Therefore, the write processing part 24 changes the information on the block map 23 associated with the processing target LBA into the verification hash value and the k hash values of the write data calculated in step S24 (step S31). The write processing part 24 then terminates this write process.

Further, when the information read from the block map 23 is not the free space information, i.e., when the present write request is an overwrite request (step S22; YES), the write processing part 24 performs a delete process (step S23).

Figure 10:
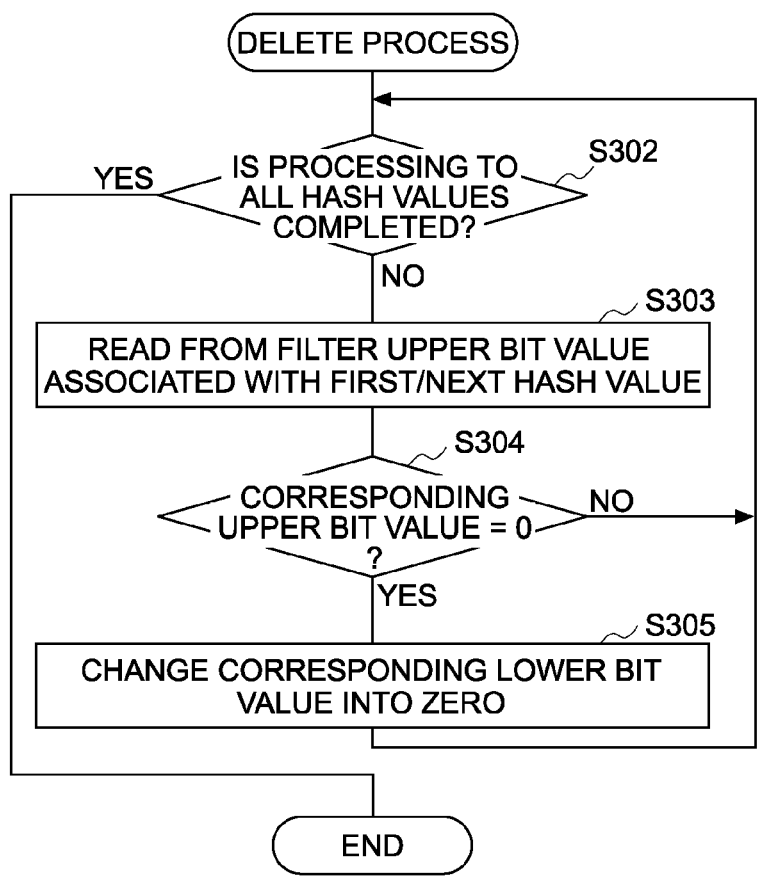
FIG. 10 is a flowchart of a delete process performed in the write process of FIG. 5.

This delete process is a process in steps shown in FIG. 10. Namely, the write processing part 24 having started the delete process, first, calculates the k hash values relating to the verification hash value read from the block map 23, and judges whether or not the processing to all calculated hash values is completed (step S302).

If the processing to all hash values is not completed (step S302; NO), the write processing part 24 reads from the filter 28 a value of the upper bit associated with the first (or next) hash value (hereinafter termed the processing target hash value) in the k hash values (step S303).

If the read value of the upper bit associated with the processing target hash value is zero (step S304; YES), the write processing part 24 changes the value of the upper bit of the filter 28 associated with the processing target hash value into "0" (step S305). Then, the write processing part 24 restarts the processing subsequent to step S302.

Whereas if the value of the upper bit associated with the processing target hash value is "1" (step S304; NO), the write processing part 24 starts the processing subsequent to step S302 without changing any bit value of the filter 28.

When the processing to all hash values is completed (step S302; YES), the write processing part 24 terminates this delete process, and starts the processing subsequent to step S24 in FIG. 5.

Operation of the deduplication storage device 10 explained so far will be described more specifically referring with FIGS. 11A-11E. Note that, in the following discussion, it is assumed that k (the number of hash functions) is three. Further, the i-th lower bit from the left end of the filter 28 shown in FIG. 11A etc. is denoted as the lower bit i, and the hash value associated with the lower bit is denoted as Hi. Moreover, the upper bit associated with H3j+1-H3j+3 (the lower bit 3j+1 through the lower bit 3j+3) is denoted as the upper bit [3j+1-3j+3] (the upper bit [1-3], for example).

Suppose a case where a write request of a data x, from which three hash values H2, H6 and H14 are obtained by using three hash functions, is transmitted from the host 100 under the condition where every bit of the filter 28 is zero. Hereinafter, the three hash values obtained by using three hash functions are referred simply to as the three hash values.

In this case, at step S22 of the write process, a branch toward the "NO" side occurs. Therefore, the test process (FIG. 8) is performed without the delete process being performed. Moreover, since the value of the lower bit 2 associated with the first hash value (suppose that it is H2) is zero (FIG. 8, step S104; YES), the data x is judged to be a new data by the test process.

Therefore, a branch toward the "YES" side occurs at step S25 (FIG. 5), and the write data is written into the storage device 30, and then the add process (FIG. 9) is performed.

At this point, each of the value of the lower bit 2, the value of the lower bit 6, and the value of the lower bit 14 is zero (step S204; YES). Therefore, when the add process about the data x is performed, each of the values of the lower bit 2, the lower bit 6, and the lower bit 14 is changed into "1" (step S206), thereby resulting in the filter 28 illustrated in FIG. 11A.

Figure 11A:
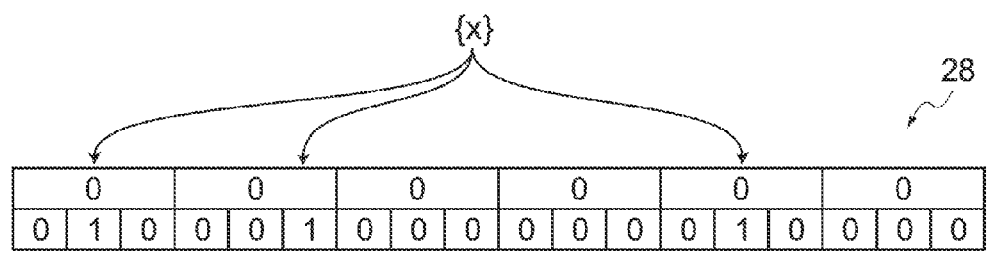
FIG. 11A is an explanatory diagram (part 1) of an update to the upper bit sharing counting Bloom filter by the write process.

When the write request for a data y, the three hash values of which are H5, H12 and H17, is transmitted from the host 100 after the filter 28 is in the situation shown in FIG. 11A, the test process and the add process are also performed. As a result, the filter 28 will be in the situation illustrated in FIG. 11B.

Figure 11B:
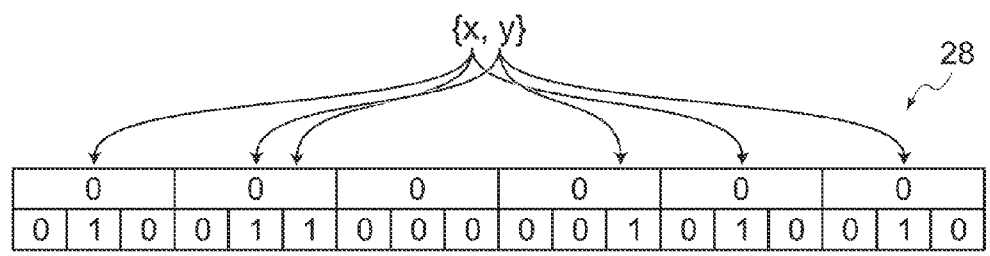
FIG. 11B is an explanatory diagram (part 2) of an update to the upper bit sharing counting Bloom filter by the write process.

When the write request for a data z, the three hash values of which are H4, H6 and H12, is transmitted from the host 100 under the condition where the filter 28 is in the situation shown in FIG. 11B, the test process and the add process are also performed. However, in this case, while the value of the lower bit 4 is "0", the values of the lower bit 6 and the lower bit 12 are "1s". Consequently, at step S204 (FIG. 9) for H4, a branch toward the "YES" side occurs, and at step S204 with respect to each of H6 and H12, a branch toward the "NO" side occurs. As a result, the filter 28 will be in the situation shown in FIG. 11C.

Figure 11C:
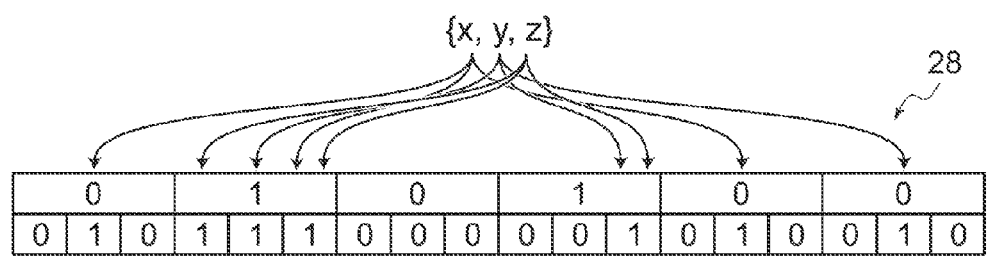
FIG. 11C is an explanatory diagram (part 3) of an update to the upper bit sharing counting Bloom filter by the write process.

Next, suppose a case where an overwrite request of the data x (the write request for data x' to the same LBA as the data x) is transmitted from the host 100 under the condition where the filter 28 is in the situation shown in FIG. 11C. In this case, at step S21, H2, H6 and H14 are read from the block map 23 as the three hash value about the data x. Then, a branch toward the "YES" side occurs at step S22, and the delete process (FIG. 10) is started.

Since the value of the upper bit [1-3] is zero at this point (step S304; YES), as for H2, the value of the lower bit 2 is changed into zero (step S305). Further, the value of the upper bit [13-15] is "0" (step S304; YES), and therefore, as for H14, the value of the lower bit 14 is also changed into "0" (step S305). However, since the value of the upper bit [4-6] is "1" (step S304; NO), the value of the lower bit 6 is not changed.

Figure 11D:
FIG. 11D is an explanatory diagram (part 4) of an update to the upper bit sharing counting Bloom filter by the write process.
Figure 11E:
FIG. 11E is a diagram for explaining the meaning of the situation of the upper bit sharing counting Bloom filter shown in FIG. 11D.

Consequently, when the delete process is completed, the filter 28 will be in the situation shown in FIG. 11D. This situation is identical with the situation shown in FIG. 11, i.e., the situation where the write request for the data x and the write request for the data y are transmitted from the host 100.

Figure 1A:
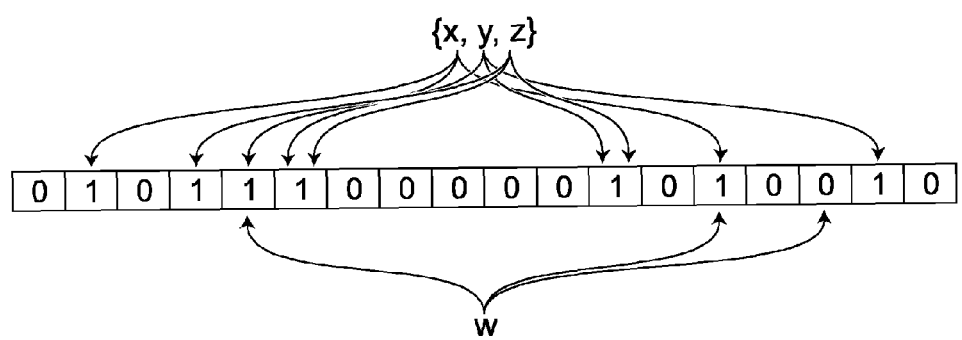
FIG. 1A is an explanatory diagram of a Bloom filter.
Figure 1B:
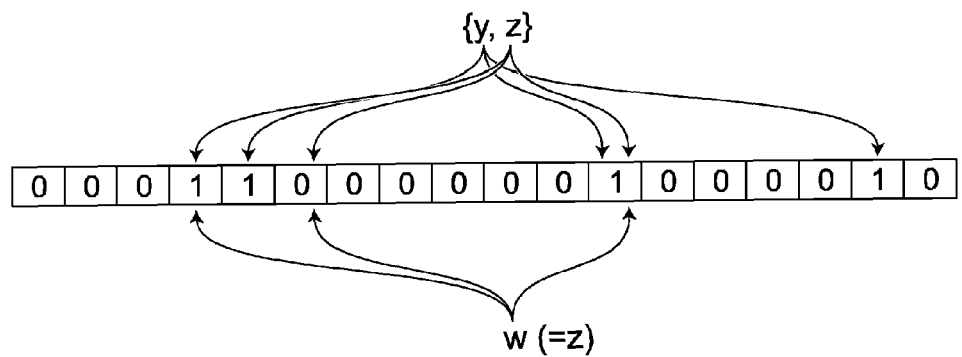
FIG. 1B is a diagram for explaining why the registered information cannot be deleted from the Bloom filter.
Figure 2A:
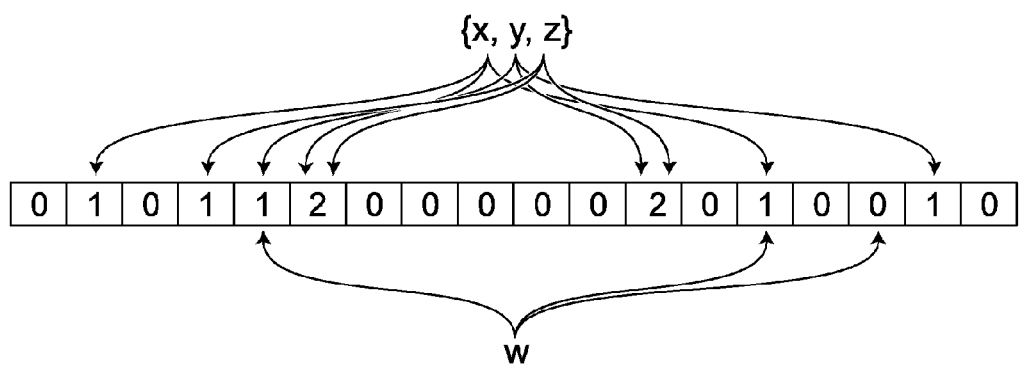
FIG. 2A is an explanatory diagram of a counting Bloom filter.
Figure 2B:
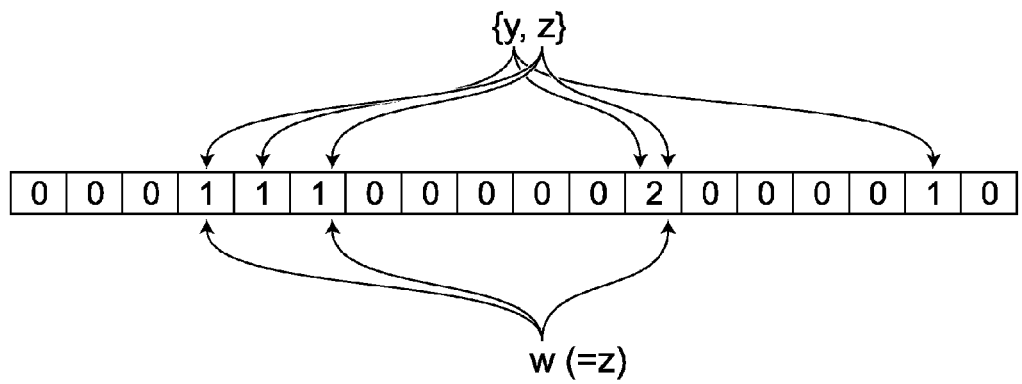
FIG. 2B is an explanatory diagram of the counting Bloom filter from which information about the data x is deleted.

Further, as obvious from the flowchart (FIG. 9), the processing performed to the lower bits of the filter 28 by the add process is the same as the processing performed to the usual Bloom filter (refer to FIGS. 1A and 1B).

The filter 28 is therefore the data structure that is capable of performing the same judgment (refer to FIG. 8) as the usual Bloom filter by using the lower bit values thereof. Moreover, although the filter 28 is the data structure from which the registered information can be deleted (refer to FIGS. 11C-

11E) as with the CBF, the filter 28 uses less memory than the CBF by the size of bits omitted by sharing the upper bits.

Referring back to FIG. 4, operation of the read processing part 22 will be discussed.

Figure 12:
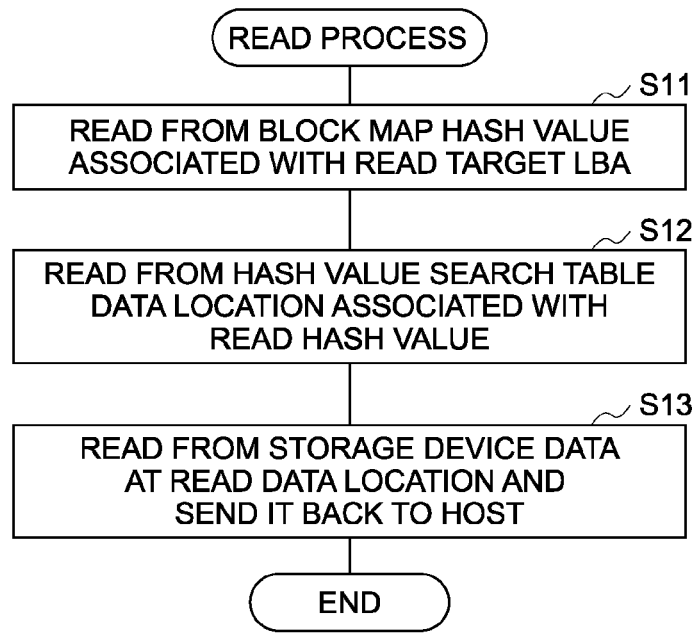
FIG. 12 is a flowchart of a read process that a read processing part of the deduplication storage device according to the embodiment performs.

The read processing part 22 is a unit (a functional block) which processes the read requests from the host 100. When receiving a read request from the protocol processing part 21, the read processing part 22 starts a read process of steps shown in FIG. 12, and, at first, reads the verification hash value ("hash value" in FIG. 12) associated with the processing target LBA (LBA in the read request) from the block map 23 (step S11).

Subsequently, the read processing part 22 reads the data location associated with the read hash value from the hash value search table 25 (step S12). Then, the read processing part 22 reads the data at the read data location from the storage device 30 and sends back it to the host 100 (step S13), and terminates this read process.

Moreover, the above-mentioned write processing part 24 has a capability to perform a rebuild process when the number of the upper bits whose values are ones exceeds a predetermined number.

Figure 13:
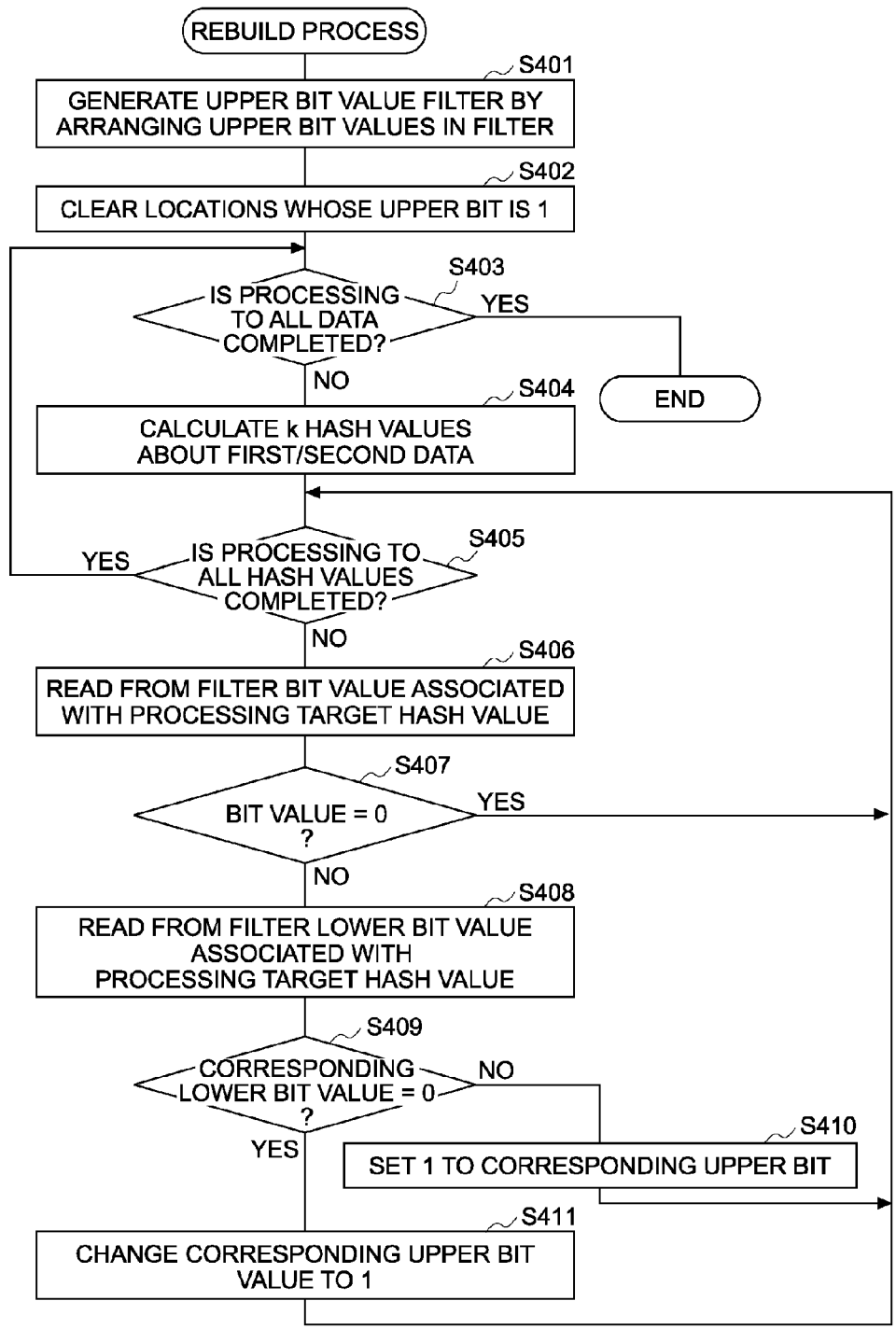
FIG. 13 is a flowchart of a rebuild process that the write processing part of the deduplication storage device according to the embodiment performs.

The rebuild process that the write processing part 24 can perform is a process in a procedure shown in FIG. 13.

Figure 14:
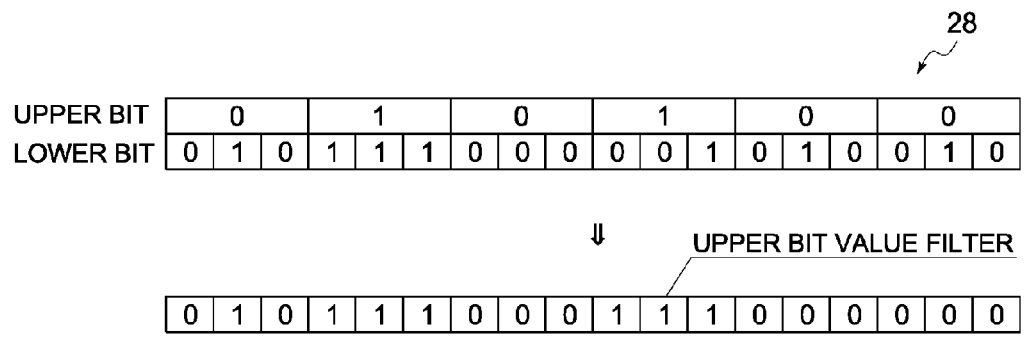
FIG. 14 is an explanatory diagram of the upper bit value filter generated by the rebuild process.

That is, the write processing part 24 having started this rebuild process, to begin with, generates on the memory 12 an upper bit value filter which is a sequence of the upper bit values of the filter 28 (step S401). More specifically, the write processing part 24 generates, as schematically shown in FIG. 14, the upper bit value filter by arranging each upper bit of the filter 28 as many as the number of its lower bits.

Subsequently, the write processing part 24 clears the locations of the filter 28 whose upper bit is "1" to "0" (step S402). Herein, the locations of the filter 28 whose upper bit is "1" are defined as the upper bit whose value is one and the three lower bits corresponding to the upper bit.

Thereafter, the write processing part 24 judges whether the processing subsequent to step S404 to all data in the storage device 30 is completed (step S403). If the processing about all data is not completed (step S403; NO), the write processing part 24, at first, calculates the k hash values about the first/next data in the storage device (step S404).

Next, the write processing part 24 performs, with respect to each of the calculated hash values (step S405; NO), the processing subsequent to step S406.

The write processing part 24 having started the processing subsequent to step S406 about a given hash value (which will be hereinafter termed the processing target hash value), first, reads the bit value associated with the processing target hash value from the upper bit value filter (step S406).

If the read bit value is "0" (step S407; YES), the write processing part 24 loops back to step S405 without performing any special processing, and starts the processing to the next hash value.

On the other hand, if the read bit value is "1" (step S407; NO), the write processing part 24 reads the value of the lower bit associated with the processing target hash value from the filter 28 (step S408). Then, the write processing part 24, when the read value is "0" (step S409; YES), changes the value of the lower bit associated with the processing target hash value into "1" (step S411), and returns to step S405 to start the processing to the next hash value.

Further, the write processing part 24, when the read value is "1" (step S409; NO), sets "1" to the upper bit associated with the processing target hash value (step S410). Then, the write processing part 24 returns to step S405, and starts the processing to the next hash value.

The write processing part 24, after performing such processing to each of the calculated hash values (step S405; YES), performs the same processing to each remaining data. Then, the write processing part 24, when the processing to all data is completed (step S403; YES), terminates this rebuild process.

In short, as is clear from the above-mentioned update procedure, the filter 28 according to the present embodiment is the data structure where the value ("0" or "1") of each lower bit whose upper bit is "0", is always exact. This is why rebuilding of the value ("0" or "1") of each lower bit whose upper bit is "1", is omitted in the rebuild process.

Modified Embodiment

Figure 15:
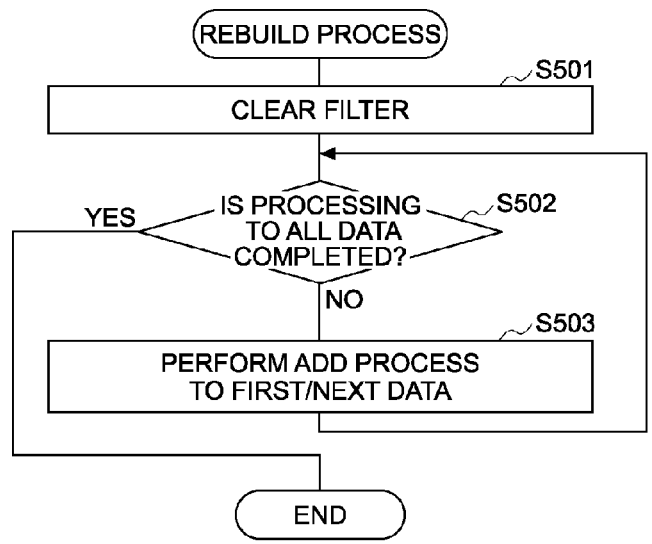
FIG. 15 is a flowchart of a rebuild process that can be used instead of the rebuild process in FIG. 13.

Various modifications are possible for the deduplication storage device 10 described above. For example, the deduplication storage device 10 may be modified into a device that performs the rebuild process in a procedure shown in FIG. 15 instead of the aforesaid rebuild process (FIG. 13). That is, the deduplication storage device 10 may be modified into the device that performs the rebuild process (step S501-S503) where the add process (FIG. 9) to every data in the storage device 30 is carried out after the filter 28 is cleared.

Figure 16A:
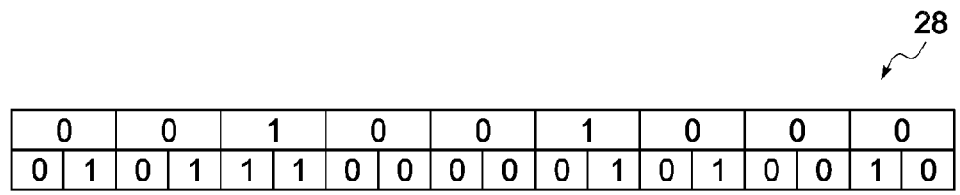
FIG. 16A is an explanatory diagram of a modified example of the upper bit sharing counting Bloom filter.
Figure 16B:
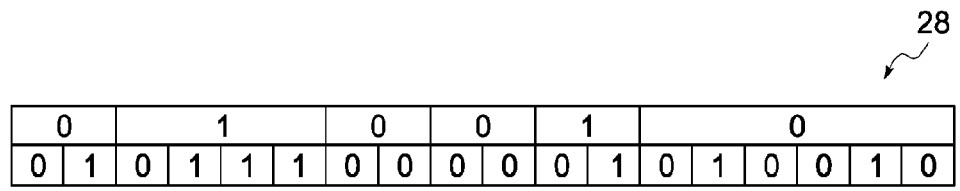
FIG. 16B is an explanatory diagram of a modified example of the upper bit sharing counting Bloom filter.

Further, it is possible to use the upper bit sharing CBF 28 having one upper bit for every two lower bits as shown in FIG. 16A. It is also possible to use the upper bit sharing CBF 28 where the numbers of the lower bits associated with respective upper bits are not identical as shown in FIG. 16B.

Figure 17:
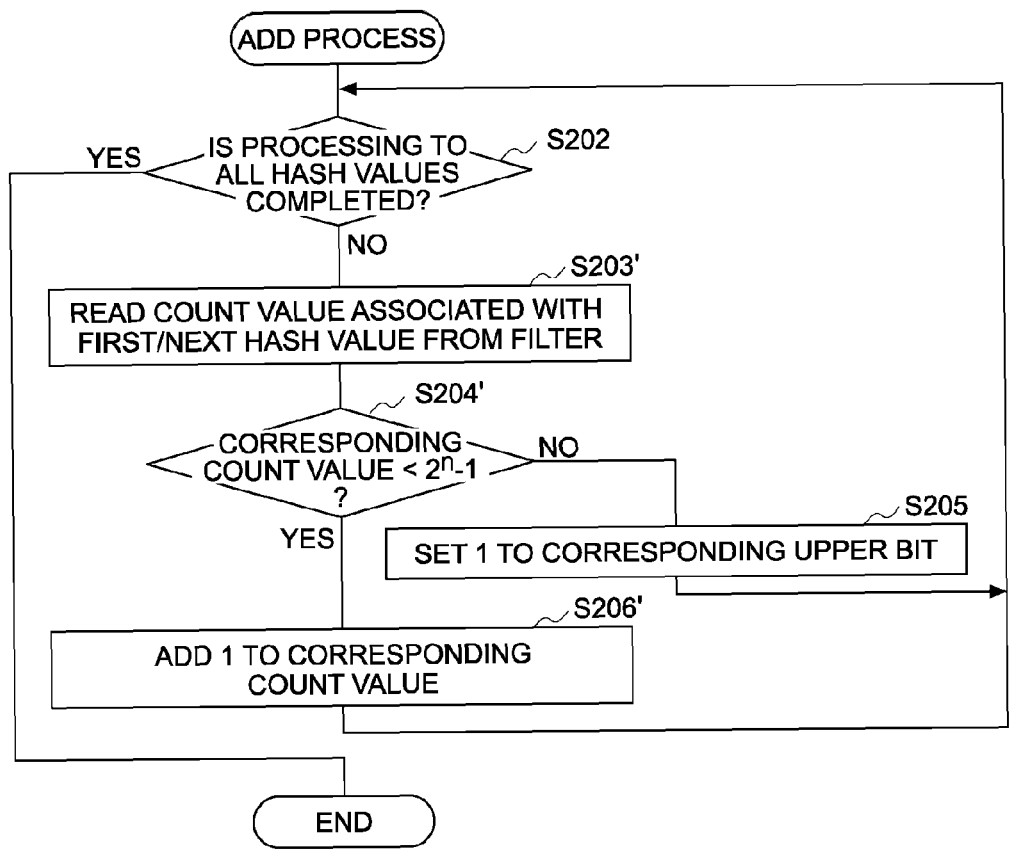
FIG. 17 is a flowchart of the add process for the upper bit sharing counting Bloom filter that can store n bits as each count value.

Furthermore, it is possible to adopt the upper bit sharing CBF 28 having storage areas which corresponds to the lower bits and each of which can store n bits data (denoted hereinafter as the count value). Note that, when using such upper bit sharing CBF 28, the deduplication storage device 10 may be configured to perform the add process in steps shown in FIG. 17 and the delete process in steps shown in FIG. 18.

That is, when using the upper bit sharing CBF 28 capable of storing count values of n bits, the deduplication storage device 10 may be configured to perform the add process different from the above-mentioned add process in the following points:

In step S203' corresponding to step S203, the count value associated with the first/next hash value (which will be denoted hereinafter as the corresponding count value) is read from the filter 28;

In step S203' corresponding to step S203, it is judged whether "the corresponding count value$<2^n-1$" is satisfied; and In step S206' corresponding to step S206, "1" is added to the corresponding count value.

Further, when using the upper bit sharing CBF 28 capable of storing count values of n bits, the deduplication storage device 10 may be configured to perform the delete process different from the above-mentioned delete process in the following point.

In step S305' corresponding to step S305, the count value of the filter 28 is decremented by "1".

The deduplication storage device 10 may be modified into a device including the block map 23 whose structure is different form that of the above block map 23 and/or the hash value search table 25 whose structure is different form that of the hash value search table 25. Moreover, it is taken for granted that it is possible to prepare, on the basis of the storage control program 20, a program that makes a computer perform the above process of judging existence of data by referring to and updating the upper bit sharing CBF 28, and that the above process of judging existence of data judging existence of data may be applied to a device other than the deduplication storage device 10.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments) of the present invention have been described in detail, it should be understood that the various changes, substitutions, and alterations could be made hereto without departing from the spirit and scope of the invention.

What is claimed is:

1. A data existence judging device, comprising:
    L number of first storage areas each of which associated with one of L number of hash values different from each other and is capable of storing a count value of n ($\geq 1$) bit(s);
    M number of second storage areas each of which associated with one or more of the L ($>$M) number of hash values different from each other and is capable of storing a value of one bit;
    an information setting part, with respect to each data in a data set, to calculate k number of hash values about the data using k number of hash functions that returns one of the L number of hash values, and, with respect to each calculated hash value, when a count value stored in a first storage area associated with the calculated hash value among the L number of first storage areas is less than $2^n-1$, to count up the cont value, whereas when the count value is equal to $2^n-1$, to set "1" into a second storage area associated with the calculated hash value; and
    a judging part to calculate k number of hash values about an input data using the k number of hash functions, and to judge, when a count value stored in a first storage area associated with the input data among the L number of first storage areas is "0", that the input data is a new data.

2. The data existence judging device according to claim 1, wherein the L number of first storage areas and the M number of second storage areas are reserved on a memory so that a count value stored in a first storage area among the L number of first storage areas associated with a data and values stored in second storage areas among the M number of second storage areas associated with the data can be read by accessing the memory once.

3. The data existence judging device according to claim 1, further comprising a registered information delete part to calculate, using the k number of hash functions, k number of hash values about a data to be removed from the data set, and, with respect to each calculated hash value, to decrement a count value in a first storage area, among the L number of first storage areas, associated with the calculated hash value by "1" when a value in the second storage area, among the M number of second storage areas, associated with the calculated hash value is "0".

4. The data existence judging device according to claim 1, wherein n is one.

5. The data existence judging device according to claim 1, wherein each second storage area in the L number of the second storage areas is associated with hash values of the same number.

6. A data existence judging method, performed by a computer, of judging whether an input data is a new data not included in an existing data set by using L number of first storage areas and M ($>$L) number of second storage area reserved on a memory, each of the L number of first storage areas being associated with one of L number of hash values different from each other and being capable of storing a count value of n ($\geq 1$) bit(s), and each of the M number of second storage areas being associated with one or more of the L number of hash values different from each other and being capable of storing a value of one bit, the data existence judging method comprising:
    with respect to each data in a data set, calculating k number of hash values about the data using k number of hash functions that returns one of the L number of hash values;
    with respect to each calculated hash value, when a count value stored in a first storage area associated with the calculated hash value among the L number of first storage areas is less than $2^n-1$, counting up the count value, whereas when the count value is equal to $2^n-1$, setting "1" into a second storage area associated with the calculated hash value among the M number of second storage areas; and
    calculating k number of hash values about an input data using the k number of hash functions, and judging that the input data is a new data when a count value stored in a first storage area associated with the input data among the L number of first storage areas is "0".

7. A non-transitory computer readable medium storing a program, the program makes a computer operate as:
    L number of first storage areas each of which associated with one of L number of hash values different from each other and is capable of storing a count value of n ($\geq 1$) bit(s);
    M number of second storage areas each of which associated with one or more of the L ($>$M) number of hash values different from each other and is capable of storing a value of one bit;
    an information setting part, with respect to each data in a data set, to calculate k number of hash values about the data using k number of hash functions that returns one of the L number of hash values, and, with respect to each calculated hash value, when a count value stored in a first storage area associated with the calculated hash value among the L number of first storage areas is less than $2^n-1$, to count up the cont value, whereas when the count value is equal to $2^n-1$, to set "1" into a second storage area associated with the calculated hash value; and
    a judging part to calculate k number of hash values about an input data using the k number of hash functions, and to judge, when a count value stored in a first storage area associated with the input data among the L number of first storage areas is "0", that the input data is a new data.

* * * * *